United States Patent [19]
Young

[11] Patent Number: 6,123,138
[45] Date of Patent: Sep. 26, 2000

[54] EXTENSIBLE WINDOW SHADING DEVICE

[76] Inventor: Hai Tee Young, P.O. Box 6301, Rosemead, Calif. 91770

[21] Appl. No.: 09/327,428

[22] Filed: Jun. 7, 1999

[51] Int. Cl.⁷ ...................................................... E06B 9/38
[52] U.S. Cl. ............................... 160/168.1 R; 160/370.21
[58] Field of Search ...................... 160/168.1 R, 172 R, 160/176.1 R, 370.21, 136, 152, 160, 166.1 R; 296/97.7, 97.8, 97.1

[56] References Cited

U.S. PATENT DOCUMENTS

| | | | |
|---|---|---|---|
| 1,360,560 | 11/1920 | Morton | 160/168.1 R |
| 2,760,566 | 8/1956 | Musheli | 160/168.1 R |
| 3,008,519 | 11/1961 | Hawkins | 160/172 R X |
| 4,929,014 | 5/1990 | Clark et al. | 160/370.21 X |

*Primary Examiner*—David M. Purol
*Attorney, Agent, or Firm*—Raymond Y. Chan; David and Raymond

[57] ABSTRACT

An extensible window shading device for a window area of a house and a passenger transportation includes a pair of extensible devices, a pair of mounting devices, a blinding devices, and a rack fastening device. Each of the extensible devices comprises a left head rack, a right head rack, a predetermined number of left body racks, a predetermined number of right body racks corresponding in number to the left body racks, a left foot rack and a right foot rack. A top end of each extensible device is firmly connected with, for example by screwing, a supporting head, which is mounted on the mounting device. The blinding device includes a predetermined number of thin and light slats, in which each slat has two cylindrical plugs coaxially protruded from two ends thereof. Each cylindrical plug of each slat has a corresponding cap for affixing the slat on the extensible device by engaged with the corresponding cylindrical plug. The rack fastening device includes a fastening plug and a fastening cap for fastening the extensible device.

4 Claims, 11 Drawing Sheets

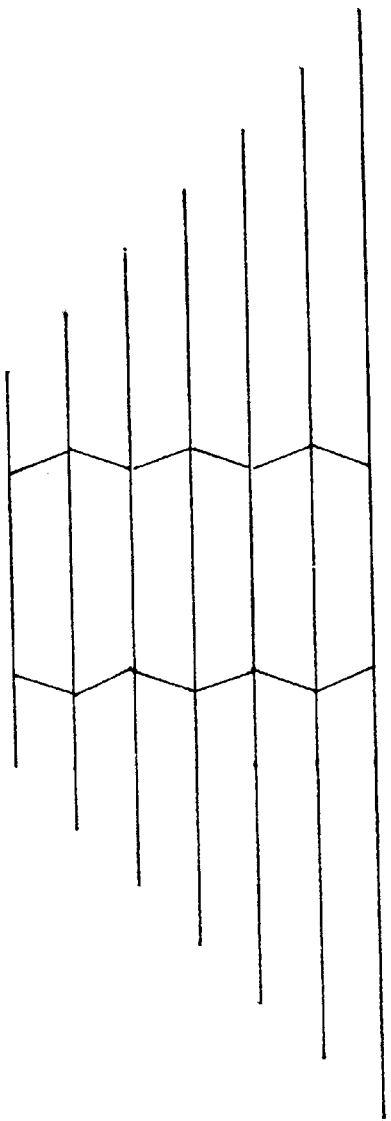
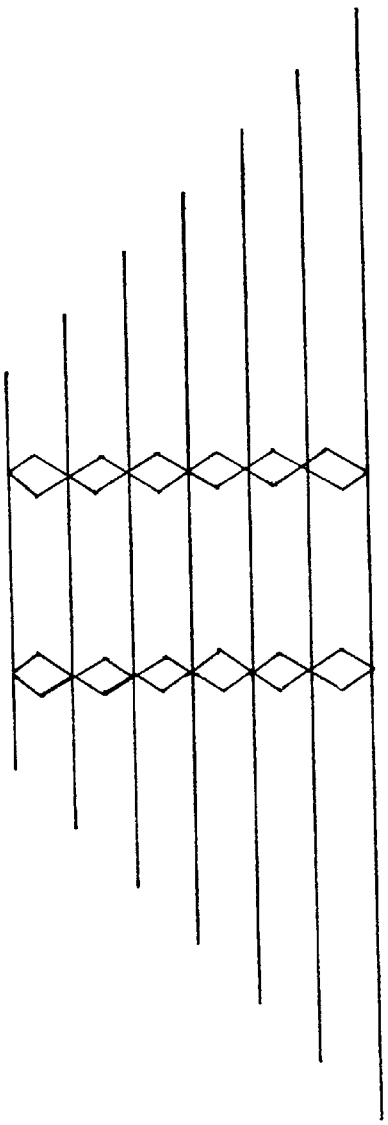

EXTENSIBLE WINDOW SHADING DEVICE

FIELD OF THE PRESENT INVENTION

The present invention relates to a window shading device, and more particularly to an extensible window shading device for window area of a house or a passenger transportation such as vehicle, train, ship and ferry, etc. The extensible window shading device of the present invention can be easily operated to block out the sun and the radiation thereof, thus reduced the contact between the sun and people.

BACKGROUND OF THE PRESENT INVENTION

It is well known that over exposure under sunshine is harmful to human health, for example it destroys human skin cell, irritates eyes, and in the worst situation causes skin cancer. The most frequent contact with he sun is during the transporting period, the drivers or the passengers on transportation such as trains, buses, ships, and trains are always inevitably disturbed or hurt by the radiation of sunshine. Most people complain about the radiation of sunshine because it damages their skin and makes their skin aging and becoming rough and tanned with wrinkle.

Conventional method for reducing the shortcomings mentioned above is to tint all window glasses. However, it is illegal in most of the states in United States to tint all window glasses because the tinting may reduce the vision of the drivers and passengers, especially at night time and cloudy weather. In mass transportation, such as airplanes, ships, trains, and buses, integral rigid curtains or cloth curtains are utilized to cover the entire window area for preventing the sunshine to disturb the passengers. But, in the meantime, the curtains would obstacle the whole field of vision of the passengers.

Most drivers have such experience that when the vehicle park outdoors under the sunshine, the sun radiation may directly shine on the vehicles. The airtight interior of the vehicle will become hot and stuffy for re-entrance. Especially the steering wheel will be heated to become hand burning. The driver has to open the doors to enable air circulating for a while until the interior temperature decreases, and then starts the engine to run the air condition before the driver and the passengers get in the vehicle. It wastes much of time, so that to some impatient people, they may rush in the vehicle and drive. The extremely hot interior may affect the driving attention of the driver and the burning steering wheel is difficult to operate that may cause unexpected accident.

Two common devices are used currently to solve the aforesaid problems, which are a cardboard shelter and a twisted shelter for covering the entire front windshield of a vehicle. The cardboard shelter is made of hard cardboard paper and is foldable. The twisted shelter is made of nylon cloth with two circular springs mounted therein and is also foldable by twisting. Such conventional shelters are very troublesome that the driver has to unfold and extend it to cover the entire front windshield while parking. Before driving, the driver also has to refold and remove it from the front windshield. The folding and unfolding, as well as the installing and removing, operations are too troublesome and require much time since the interior space of a vehicle is too narrow for operating a shelter as large as the windshield Moreover, we need to reserve some room for storing the conventional extensible shelter when it is not used. The most essential shortcoming of such conventional extensible shelters is that since the space between the front windshield and the steering wheel and the back sight mirror is so narrow, every time when they are unfolded to cover or removed from the windshield, the back sight mirror may be bumped to move away from its original position. The driver has to reset the position of the back sight mirror before driving every time.

SUMMARY OF THE PRESENT INVENTION

The main objective of the present invention is to provide an extensible window shading device for window area of house and passenger transportation such as vehicle, train, ship and ferry, etc. to block out the sunshine and maintain privacy.

Another objective of the present invention is to provide an extensible window shading device for window area of house and passenger transportation that the shading angle thereof can be adjusted according to the direction and angle of the sunshine.

Another objective of the present invention is to provide an extensible window shading device for window area of passenger transportation, which can be adjusted to shelter the entire window area from sunshine while parking or anytime desired by the passengers.

Another objective of the present invention is to provide an extensible window shading device for window area of house and passenger transportation, which can be easily operated to unshelter the entire window area.

Another objective of the present invention is to provide an extensible window shading device for effectively reducing the temperature inside of the vehicle while park under the sun by blocking out the sunshine through the windows.

Accordingly, an extensible window shading device for a window area of a house and a passenger transportation, comprising a pair of extensible devices, a pair of mounting devices, a blinding devices, and a rack fastening device, wherein each of the extensible devices comprises a left head rack, a right head rack, a predetermined number of left body racks, a predetermined number of right body racks corresponding in number to the left body racks, a left foot rack and a right foot rack. A structure and shape of the left head rack, left body racks, and left foot rack are identical to the right head racks, right body racks, and the right foot rack respectively; in addition, the left head rack and the right head rack has same length and geometric configuration as the left foot rack, and the right foot rack.

Each of the left head racks the right head rack, the left foot rack, and the right foot rack comprises a first end and a second end, wherein each of the first end and the second end having an engaging hole respectively. Each of the left body racks and the right body racks comprises a first end, a second end, and a center portion, wherein each of the first end and the second end having an engaging hole and each of the center portion having a slat fastening hole. Each engaging hole and slat fastening hole provides an engaging teeth on a surface thereon.

A top end of each extensible device is firmly connected with, for example by screwing, a supporting head, which is mounted on the mounting device; the mounting device to comprises a pair of mounting heads, which are firmly affixed to an interior ceiling of a passenger transportation, for jointing with the two supporting heads so as to support the two extensible devices in position respectively. Each mounting head has a vertical joint member downwardly extended from a horizontal mounting member which is adapted for screwing and adhering to an edge of the ceiling, adjacent to the respective window area, such as the front windshield and the side window, of the passenger transportation.

The blinding device comprises a predetermined number of thin and light slats, in which each slat has two cylindrical plugs coaxially protruded from two ends thereof. Each cylindrical plug provides a plurality of longitudinal tiny teeth thereon and having an engaging slot for allowing easier engagement during installation. Each cylindrical plug of each slat has a corresponding cap for affixing the slat on the extensible device by engaged with the corresponding cylindrical plug. Each corresponding cap provides a plurality of longitudinal tiny teeth along the inner wall surface, and having a through slot for providing an expandable fitting during installation. Thereby, each slat is rotatably mounted between the extension device by inserting the two plugs of each slat through the slat fastening hole of the center portion of the left and right body racks respectively, and to be engaged with the corresponding cap.

The rack fastening device comprises a fastening plug and a fastening cap, wherein the fastening plug comprises a connecting portion having an engaging slot, and a base head portion integrally attached to the connecting portion. The fastening cap comprises a fastening portion having a through slot and a base cap portion integrally attached to the fastening portion. The fastening portion of the fastening cap provides a plurality of longitudinal tiny teeth along an outer surface for friction resistance. The base head portion and the base cap portion each has a diameter that is greater than a diameter of the connecting portion and the fastening portion respectively; the diameter of the connecting portion of the fastening plug is fittedly equaled to the diameter of the fastening portion of the fastening cap. The diameter of the fastening portion is fittedly equaled to a diameter of the engaging hole of the each rack. The connecting portion of the fastening plug has a length equal to a length of the fastening portion of the fastening cap and equal to a width of two racks of the extensible device.

BRIEF DESCRIPTION OF THE DRAWINGS

FIG. 14 is a schematic view of a second alternative embodiment of the extensible window shading device of the present invention.

FIG. 15 is a schematic view of a third alternative embodiment of the extensible window shading device of the present invention.

DETAILED DESCRIPTION OF THE PREFERRED EMBODIMENT

Figure 1:
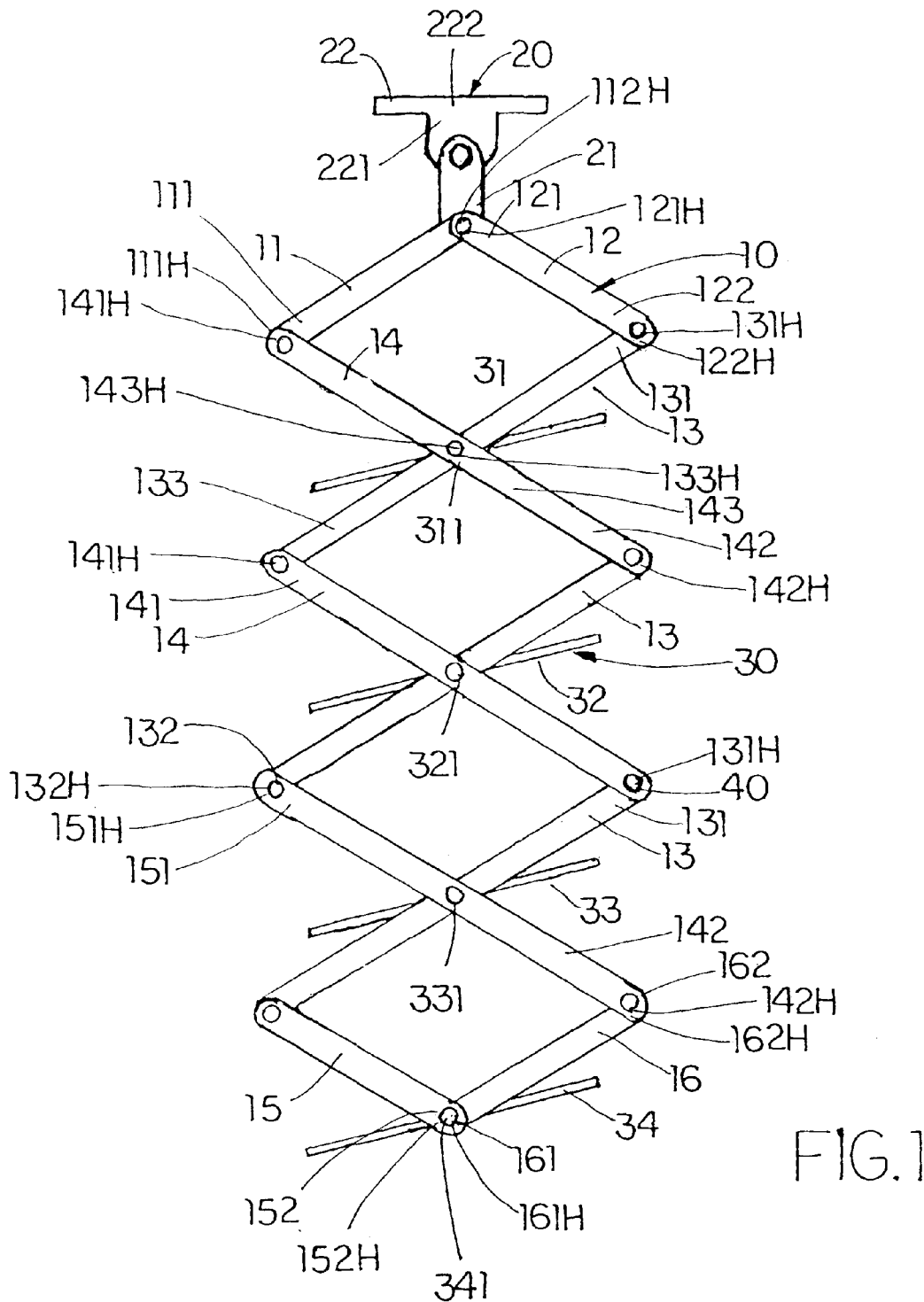
FIG. 1 is a side view of an extensible window shading device according to a first preferred embodiment of the present invention, wherein the extensible window shading device is in an expanded form.

Referring to FIGS. 1 to 7 of the drawing, an extensible window shading device for window area of house and passenger transportation according to a first preferred embodiment of the present invention is illustrated. The extensible window shading device comprises a pair of extensible devices 10, a pair of mounting devices 20, a blinding device 30, and a rack fastening device 40.

As shown in FIGS. 1 to 5, each of the extensible devices 10 comprises a left head rack 11, a right head rack 12, a predetermined number of left body racks 13, a predetermined number of right body racks 14 corresponding in number to the left body racks 13, a left foot rack 15 and a right foot rack 16, in accordance with the present preferred embodiment, there are totally three sets of left and right body racks 13, 14. In fact, the number of the sets of the left and right body racks 13, 14 for the extensible device 10 can be two, four, five, or six, depending on the size of the window area of the passenger transportation and the desire of users. The structure and shape of the left head rack 11, left body racks 13, and left foot rack 15 are identical to the right head racks 12, right body racks 14, and the right foot rack 16 respectively. In addition, the left head rack 11 and the right head rack 12 has same length and geometric configuration as the left foot rack 15, and the right foot rack 16.

Each of the left head rack 11, the right head rack 12, the left foot rack 15, and the right foot rack 16 comprises a first end 111, 121, 151, 161 and a second end 112, 122, 152, 162, wherein each of the first end 111, 121, 151, 161 and the second end 112, 122, 152, 162 having an engaging hole 111H, 121H, 151H, 161H, 112H, 122H, 152H, 162H respectively. Each of the left body racks 13 and the right body racks 14 comprises a first end 131, 141, a second end 132, 142, and a center portion 133, 143, wherein each of the first end 131, 141, and the second end 132, 142 having an engaging hole 131H, 141H, 132H, 142H, each of the center portion 133, 143 having a slat fastening hole 133H, 143H. Each engaging hole 111H, 121H, 151H, 161H, 112H, 122H, 152H, 162H, 131H, 141H, 132H, 142H and slat fastening hole 133H, 143H provides an engaging teeth on the surface.

The blinding device 30 comprises a predetermined number of thin and light slats 31, 32, 33, 34, Each slat 31, 32, 33, 34 has two cylindrical plugs 311, 321, 331, 341 coaxially protruded from the two ends thereof. Each cylindrical plug 311, 321, 331, 341 provides a plurality of longitudinal tiny teeth 312, 322, 332, 342 thereon and having an engaging slot 313, 323, 333, 343 for easier engagement during installation. Each cylindrical plug 311, 321, 331, 341 of each slat 31, 32, 33, 34 has a corresponding cap 314, 324, 334, 344 for affixing the slat 31, 32, 33, 34 on the extensible device 10 by engaged with the corresponding cylindrical plug 311, 321, 331, 341. Each corresponding cap 314, 324, 334, 344 provides a plurality of longitudinal tiny teeth 315, 325, 335, 345 along the inner wall surface, and having a through slot 316, 326, 336, 346 for provided an expandable fitting during installation. Accordingly, each slats 31, 32, 33 can be rotatably mounted between the extension device 10 by inserting the two plugs 311, 321, 331 of each slat 31, 32, 33 through the slat fastening hole 133H, 143H of the center portion 133, 143 of the left and right body racks 13, 14 respectively, and to be engaged with the corresponding cap 314, 324, 334. It is worth to mention that the slats 34 can be rotatably mounted between the extension device 10 by inserting the two plugs 341 of slat 34 through the engaging hole 152H, 161H of the left and right foot rack 15, 16 respectively, and to be engaged with the corresponding cap 344.

The frictional engagement configuration between the teeth 312, 322, 332, 334 of each cylindrical plug 311, 321, 331, 341 plus the engaging teeth of each engaging hole 111H, 121H, 151H, 161H, 112H, 122H, 152H, 162H, 131H, 141H, 132H, 142H and slat fastening hole 133H, 143H enables the slat 31, 32, 33, 34 to be firmly held in position unless a rotating force is applied to the slat 31, 32, 33, 34 to overcome the engagement friction between the teeth 312, 322, 332, 342 and the engaging teeth. In other words, the slats 31, 32, 33, 34 are adjustable to any desire inclined angle, such as positioning at horizontal position to enable the passenger to view through or positioning at vertical position to block the sunshine.

Figure 3:
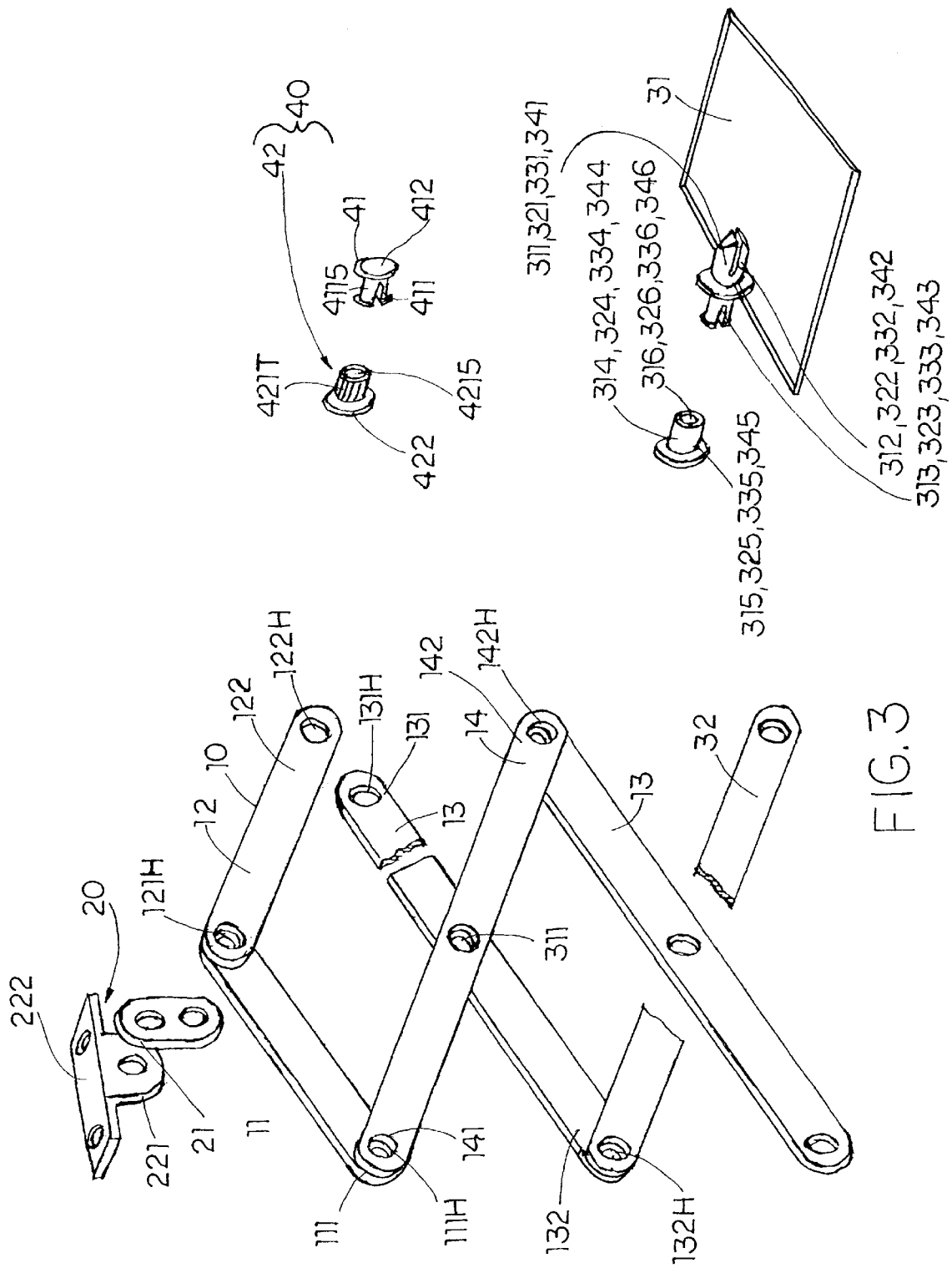
FIG. 3 is a partial exploded view of the extensible window shading device according to the first preferred embodiment of the present invention.
Figure 4:
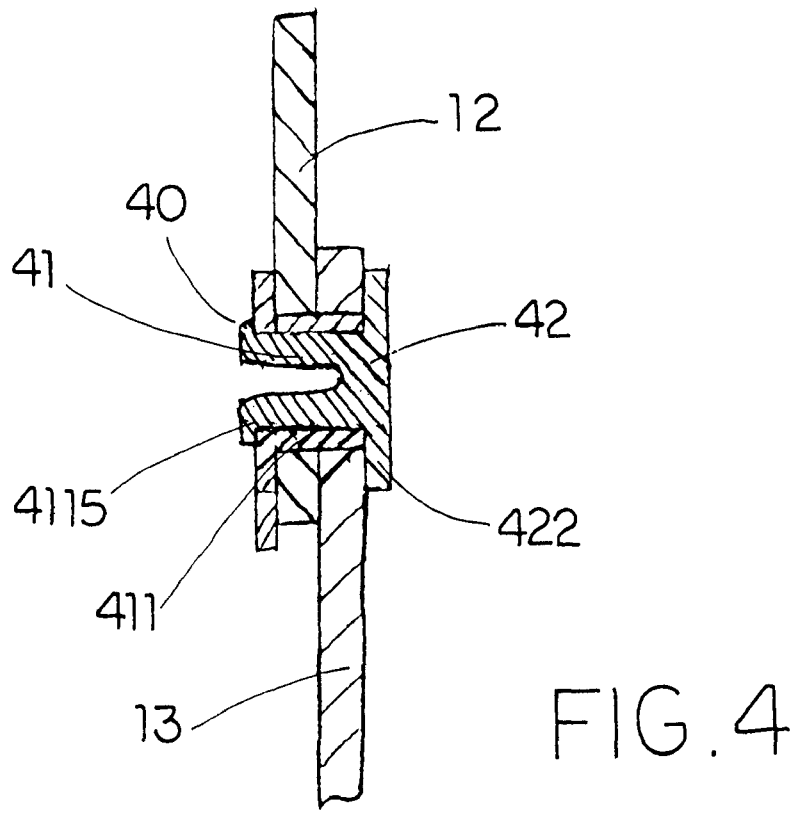
FIG. 4 is a section view of the extensible window shading device according to the first preferred embodiment of the present invention illustrating the connection between two extensible racks by a connecting device.
Figure 5:
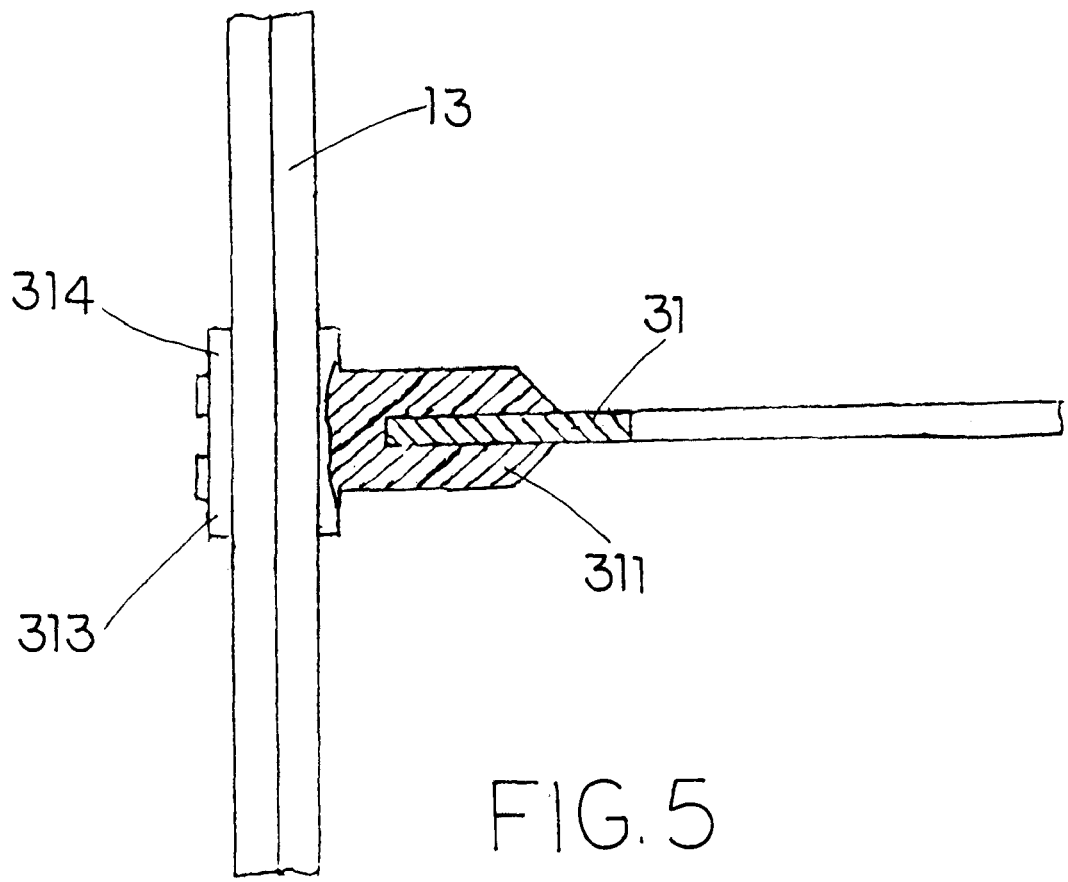
FIG. 5 is a section view of the extensible window shading device according to the first preferred embodiment of the present invention illustrating the connection between two extensible racks and a shading slat by a slat connecting device.
Figure 6A:
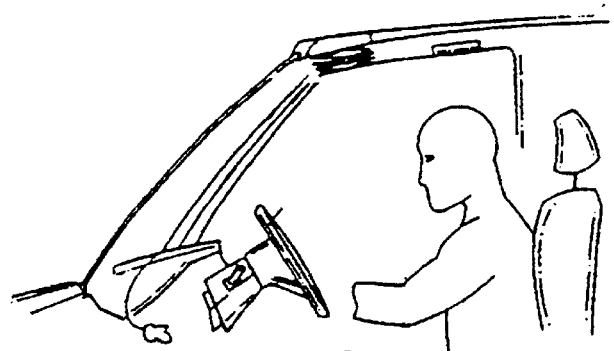
FIGS. 6A and 6B are two end views illustrating the application of the extensible window-shading device of the above second preferred embodiment of the present invention to a side window of the vehicle.
Figure 6B:
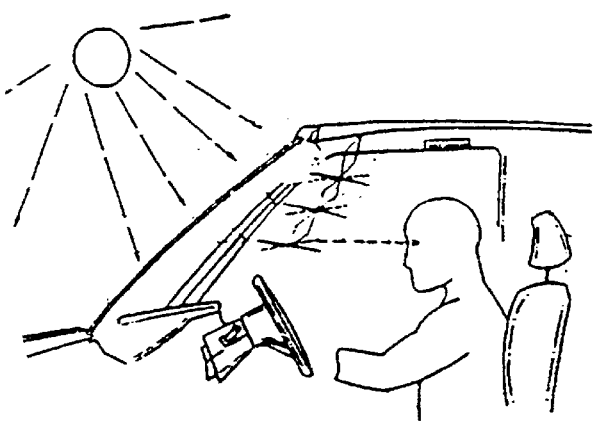
Figure 7A:
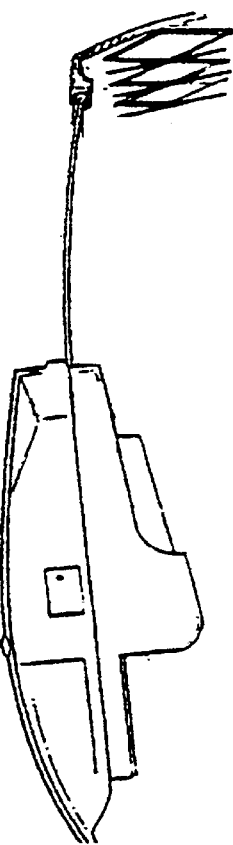
FIGS. 7A and 7B are two side views illustrating the application of the extensible window-shading device of the above second preferred embodiment of the present invention to a front windshield.
Figure 7B:
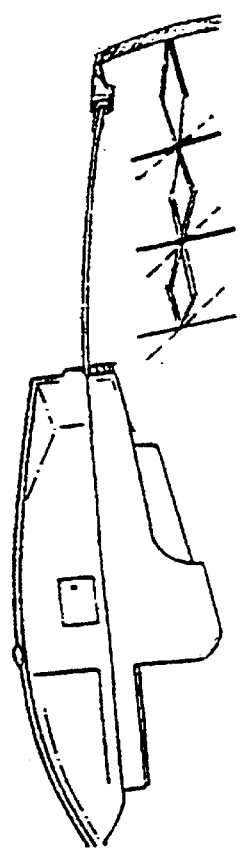

Referring to FIG. 3 of the drawing, the rack fastening device 40 comprises a fastening plug 41 and a fastening cap 42, wherein the fastening plug 41 comprises a connecting portion 411 having an engaging slot 411S, and a base head portion 412 integrally attached to the connecting portion 411; the fastening cap 42 comprises a fastening portion 421 having a through slot 421S and a base cap portion 422 integrally attached to the fastening portion 421 The fastening portion 421 of the fastening cap 42 provides a plurality of longitudinal tiny teeth 421T along an outer surface for friction resistance. The base head portion 412 and the base cap portion 422 each has a diameter that is greater than a diameter of the connecting portion 411 and the fastening portion 421 respectively. The diameter of the connecting portion 411 of the fastening plug 41 is fittedly equaled to the diameter of the fastening portion 421 of the fastening cap 42. The diameter of the fastening portion 421 is fittedly equaled to a diameter of the engaging hole 111H, 121H, 151H, 161H, 112H, 122H, 152H, 162H, 131H, 141H, 132H, 142H of the each racks. The connecting portion 411 of the fastening plug 41 has a length equal to a length of the fastening portion 421 of the fastening cap 42 and equal to a width of two racks of the extensible device 10.

Figure 2:
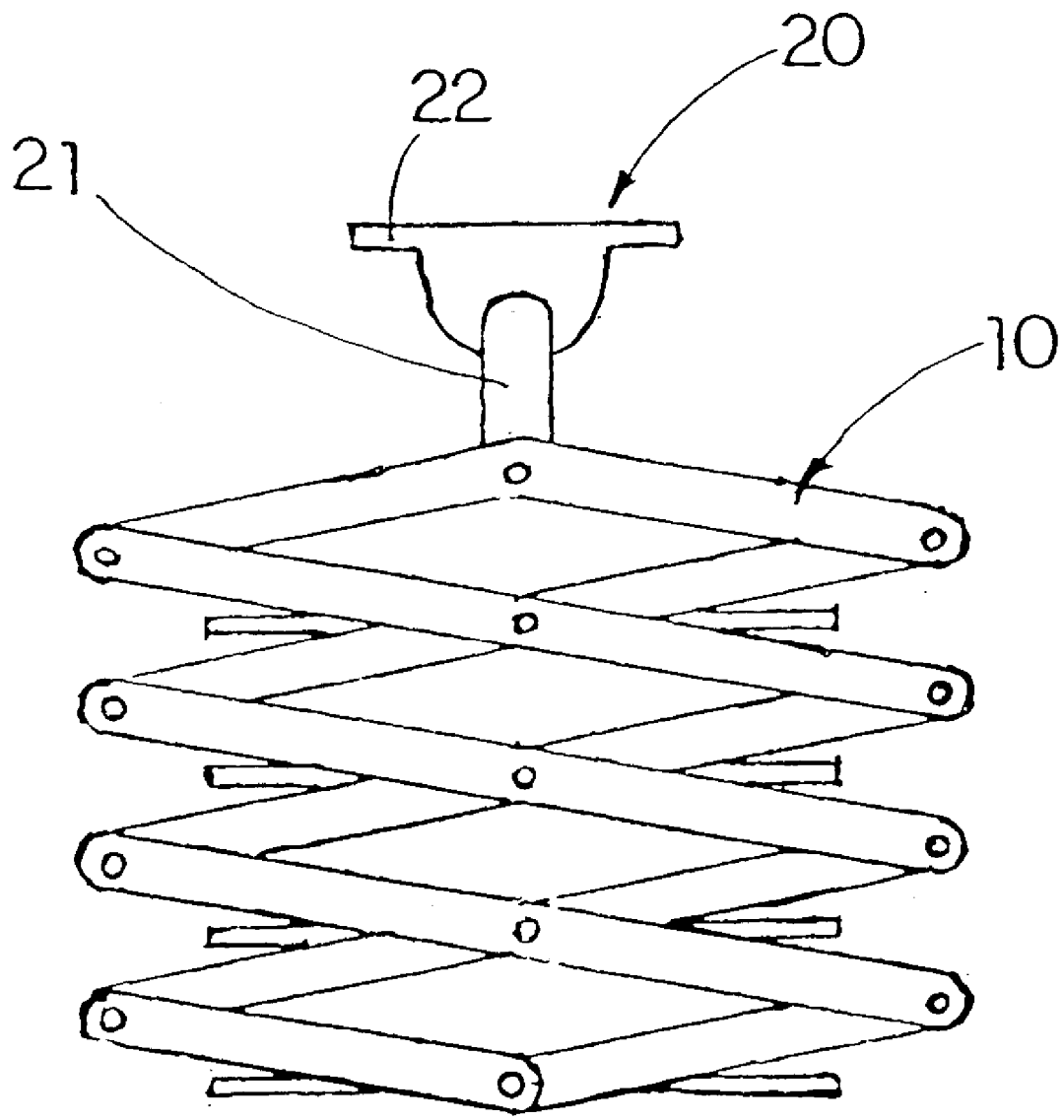
FIG. 2 is a side view of the extensible window shading device according to the first preferred embodiment of the present invention, wherein the extensible window shading device is in a contracted form.

A top end of each extensible device 10 is firmly connected with, for example by screwing or gluing, a supporting head 21, which is mounted on the mounting device 20. As shown in FIGS. 1 to 3, the mounting device 20 comprises a pair of mounting heads 22, which are firmly affixed to an interior ceiling of a passenger transportation, for jointing with the two supporting heads 21 so as to support the two extensible devices 10 in position respectively. Each mounting head 22 has a vertical joint member 221 downwardly extended from a horizontal mounting member 222 which is adapted for screwing or adhering to an edge of the ceiling, adjacent to the respective window area, such as the front windshield or the side window, of the passenger transportation.

Basically, the two extensible devices 10 are parallelly mounted on the ceiling of the passenger transportation or an adequate position on top of the household windows by means of the two mounting heads 22 of the mounting device 20. According to the present invention, the arrangement of the extensible device 10 is in a crossing manner that all the left racks 11, 13, 15 are positioned on top of the right racks 12, 14, 16. The second end 112 of the left head rack 11 is jointed with the first end 121 of the right head rack 12 by inserting the connecting portion 411 of the fastening plug 41 of the rack fastening device 40 through the engaging hole 112H, 121H, and cap off with the fastening cap 42 of the rack fastening device 40 through engaged the fastening portion 421 of the fastening cap 42 with the connecting portion 411. The first end 111 of the left head rack 11 is jointed with the first end 141 of the right body rack 14 by the rack fastening device 40 in the same matter as describe above, and the second end 122 of the right head rack 12 is jointed with the first end 131 of the left body rack 13 by the rack fastening device 40. The center portion 133, 143 of the left and right body rack 13, 14 is aligned to allow the cylindrical plugs 311, 321, 331 of the slats 31, 32, 33 to insert therein so as to fasten the slats on the left and right body rack 13, 14 of the extensible device 10. The body racks can be added as many as necessary to cover the window area. The first end 151 of the left foot rack 15 is jointed with the second end 132 of the last left body rack 13 by the rack fastening device 40, and the second end 162 of the right foot rack 16 is jointed with the second end 142 of the last right body rack 14 by the rack fastening device 40. The second end 152 of the left foot rack 15 is jointed with the first end 162 of the right foot rack 16 either by the rack fastening device 40, or if the slat 34 is fastened thereon, then jointed by the cylindrical plugs 341, and the corresponding cap 344.

As shown in FIG. 2, when the extensible window shading device of the present invention is not used, the user may contract the extensible window shading device to the minimum length by push the left and right foot rack 15, 16 upwardly until the extensible device is in complete contracted form. Therefore, the overall length of the extensible window shading device is greatly reduced. In fact the contracted extensible window shading device can be provide the same function as the conventional shelter wings installed in all vehicles.

When the extensible window shading device is used, the user may simply pull the left and right foot rack 15, 16 downwardly until the extensible device is in complete extended form. As shown in FIG. 1, the improvement of the present invention over the conventional shelter wings is that the user may further stretch out the extensible device 10 to enlarge the sheltering area. During parking, the user may turn all the slats 31, 32, 33, 34 parallel to the window area to entirely block the sunshine. Besides, the user may also adjust the inclined angle of each slat 31, 32, 33, 34 to shelter the direct sunshine and to enable the passenger to view outside.

It is worth to mention, the extensible window shading device of the present invention can further comprises a slat adjusting means for adjusting all the slats at once.

Figure 8:
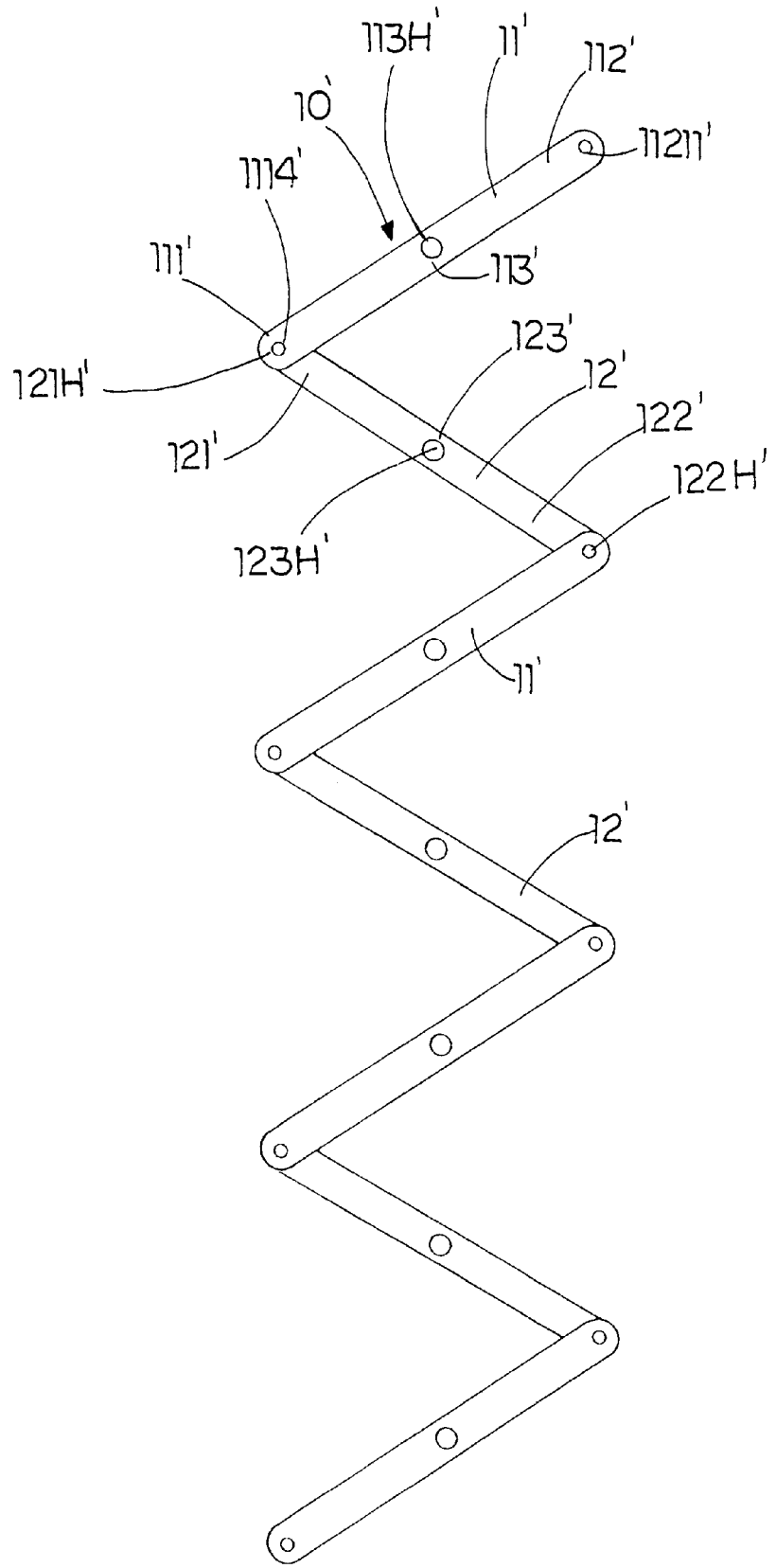
FIG. 8 is a side view of an extensible window shading device according to a second preferred embodiment of the present invention.
Figure 9:
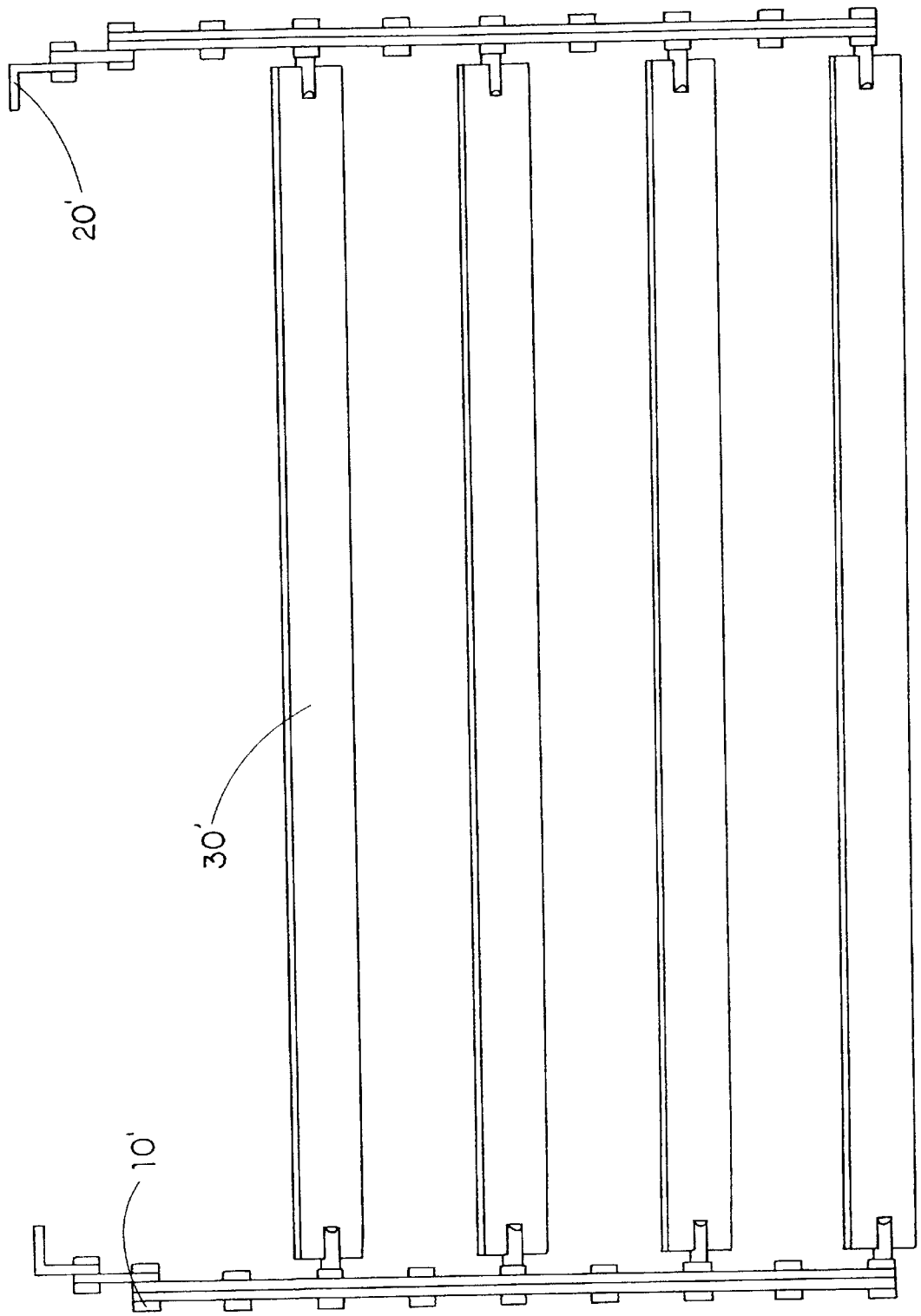
FIG. 9 is a schematic view of the extensible window shading device according to the above second preferred embodiment of the present invention.
Figure 10A:
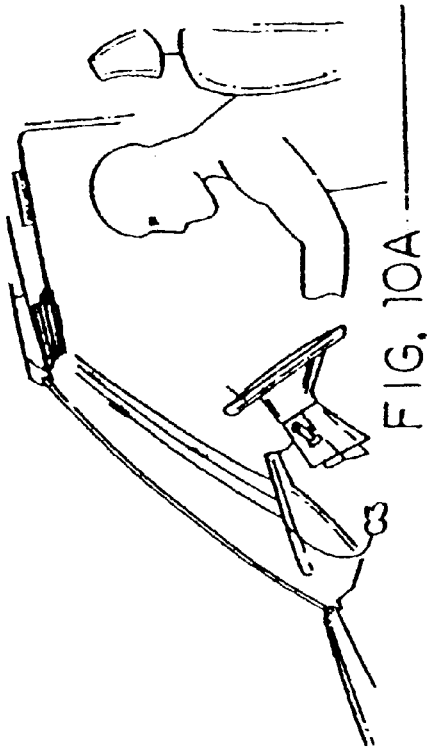
FIGS. 10A and 10B are two end views illustrating the application of the extensible window-shading device of the above second preferred embodiment of the present invention to a side window of the vehicle.
Figure 10B:
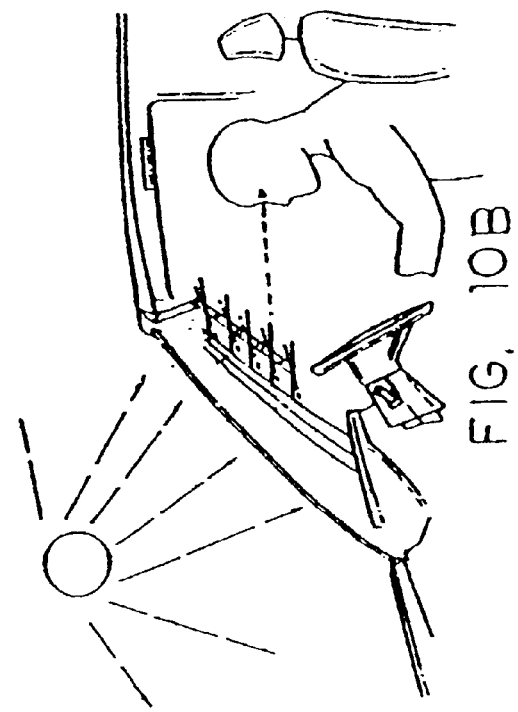
Figure 11A:
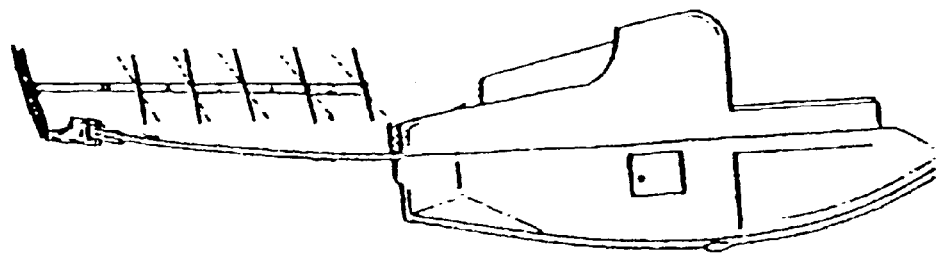
FIGS. 11A and 11B are two side views illustrating the application of the extensible window-shading device of the above second preferred embodiment of the present invention to a front windshield.
Figure 11B:
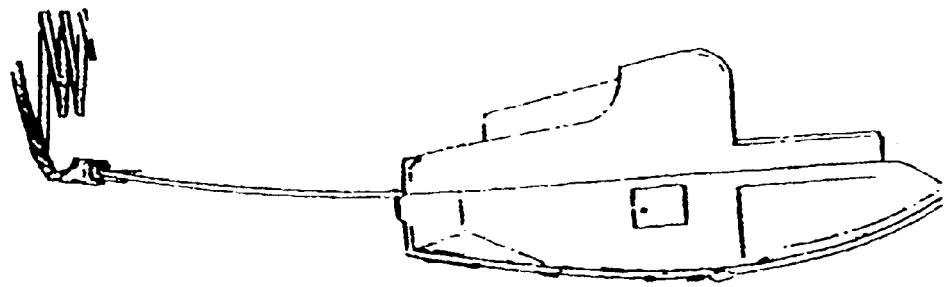

Referring to FIGS. 8 to 11 of the drawings, an extensible window shading device for window area of house and passenger transportation according to a second preferred embodiment of the present invention is illustrated. The second preferred embodiment basically use the same principle as the first preferred embodiment. The differences between the first preferred embodiment and the second preferred embodiment are that the extensible devices 10 are not arranged in a crossing manner, but instead in a retractable folding manner and the location of the blinding device 30 is adjusted accordingly. The extensible window shading device comprises a pair of extensible devices 10', a pair of mounting devices 20', a blinding device 30', and a rack fastening device 40'. The mounting device 20', the blinding device 30', and the rack fastening device 40' are all identical to the above first preferred embodiment. Basically, the two extensible devices 10' are parallelly mounted on the ceiling of the passenger transportation or an adequate position on top of the household windows by means of the two mounting heads 22 of the mounting device 20, as shown in FIG. 9.

As shown in FIGS. 8 and 9, each of the extensible device 10' comprises a plurality of top racks 11' and a plurality of bottom racks 12' which is engaged with the top racks 11' to form the extensible devices 10'. In accordance with the present preferred embodiment, there are totally four sets of top racks 11' in combination with the bottom racks 12', which can be retracted and expanded. In fact, the number of sets of the rack 11' for the extensible device can be three, four, five, or six depending on the size of the window area of the passenger transportation and the desire of users. Each top rack 11' and bottom rack 12' is identical in size, shape, and structure.

Each top rack 11' comprises a first end 111', a second end 112', and a center slat receiving section 113', wherein each of the first end 111' and the second end 112' having an engaging hole 111H', 112H' respectively and the center slat receiving section 113' having a slat fastening hole 113H'. Each bottom rack 12' comprises a first end 121', a second end 122', and a center slat receiving section 123', wherein each of the first end 121' and the second end 122' having an engaging hole 121H', 122H' respectively and the center slat receiving section 123' having a slat fastening hole 123H'.

The first end 111' of the top rack 11' is jointed with the first end 121' of the bottom rack 12' by inserting the connecting portion 411' of the fastening plug 41' of the rack fastening device 40' through the engaging hole 111H', 121H', and cap off with the fastening cap 42' of the rack fastening device 40' through engaged the fastening portion 421' of the fastening cap 42' with the connecting portion 411'. The second end 112' of the top rack 11' is connected to the mounting device 20'. The second end 122' of the bottom rack 12' is jointed with the second end 112" of the top rack 11' of the next set and so on. As mention above, the number of sets can be added accordingly depending on the size of the window. An angel between the top rack 11' and the bottom rack 12' is limited under 180 degree, so that the top rack 11' and the bottom rack 12' would not overturn.

Figure 12:
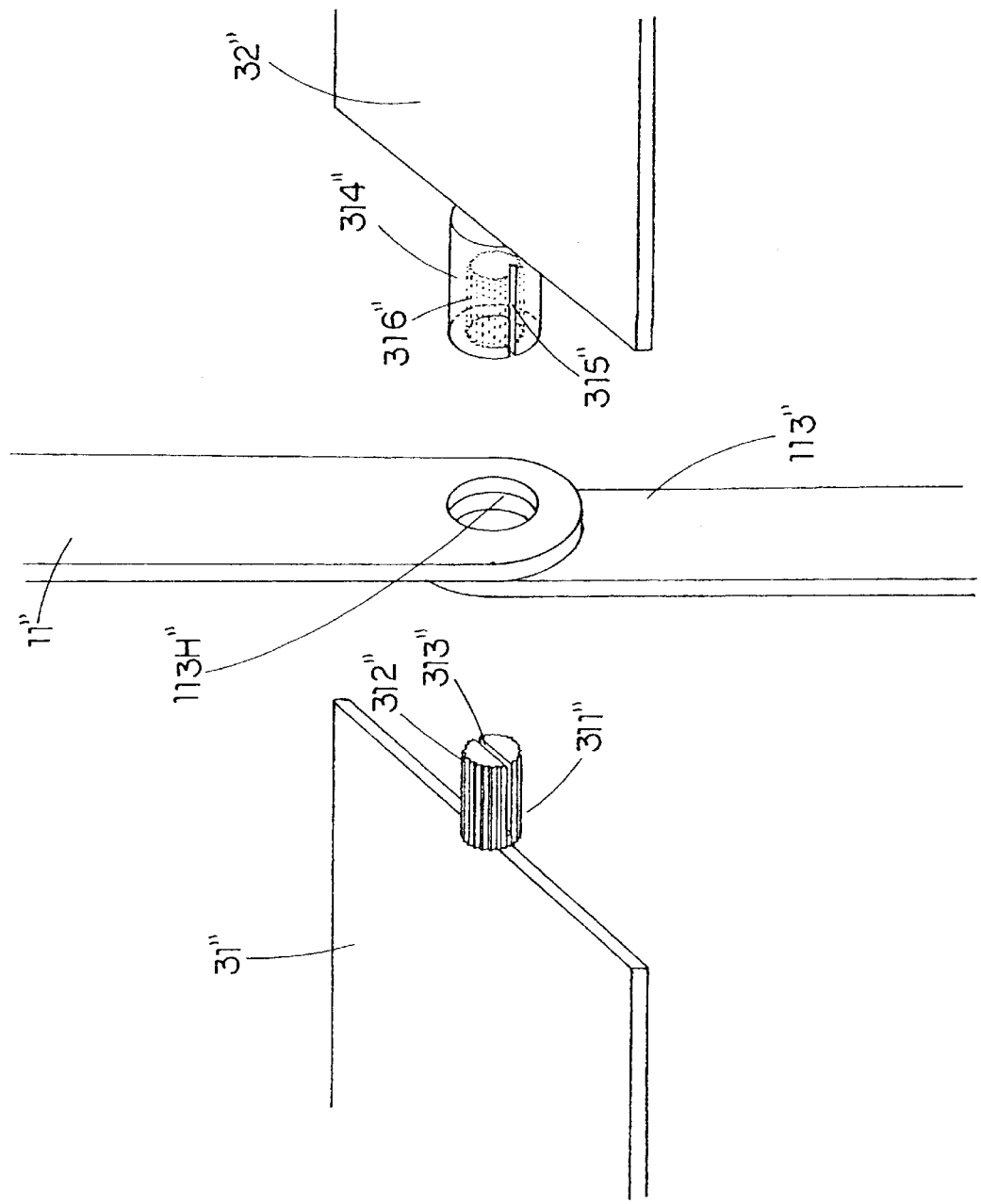
FIG. 12 is a partial exploded view of an extensible window-shading device according to a third preferred embodiment of the present invention.

Referring to FIG. 12 of the drawings, a third preferred embodiment of the present invention is illustrated. The third preferred embodiment is identical to the second preferred embodiment except the third preferred embodiment only need a single extensible device 10" with structure as describe above in the second preferred embodiment, and each blinding device 30" has a left slat 31" and a right slat 32" attached to the slat fastening hole 113H', 123H'.

Referring to FIG. 12, the left slat 31" has a cylindrical plug 311" coaxially protruded from the right end thereof. The cylindrical plug 311" provides a plurality of longitudinal tiny teeth 312" thereon and having an engaging slot 313" for easier engagement during installation. The right slat 32" has a corresponding cap 314" for affixing the right slat 32" on the extensible device 10" by engaged with the corresponding cylindrical plug 311". Each corresponding cap 314" provides a plurality of longitudinal tiny teeth 315" along the inner wall surface, and having a through slot 316" for provided an expandable fitting during installation. Accordingly, each left and right slat 31", 32" can be rotatably mounted on both side of the extension device 10" by inserting the cylindrical plugs 311" of the left slat 31" through the slat fastening hole 113H" of the center slat receiving section 113" of a first racks 11" and to be engaged with the corresponding cap 314".

Figure 13:
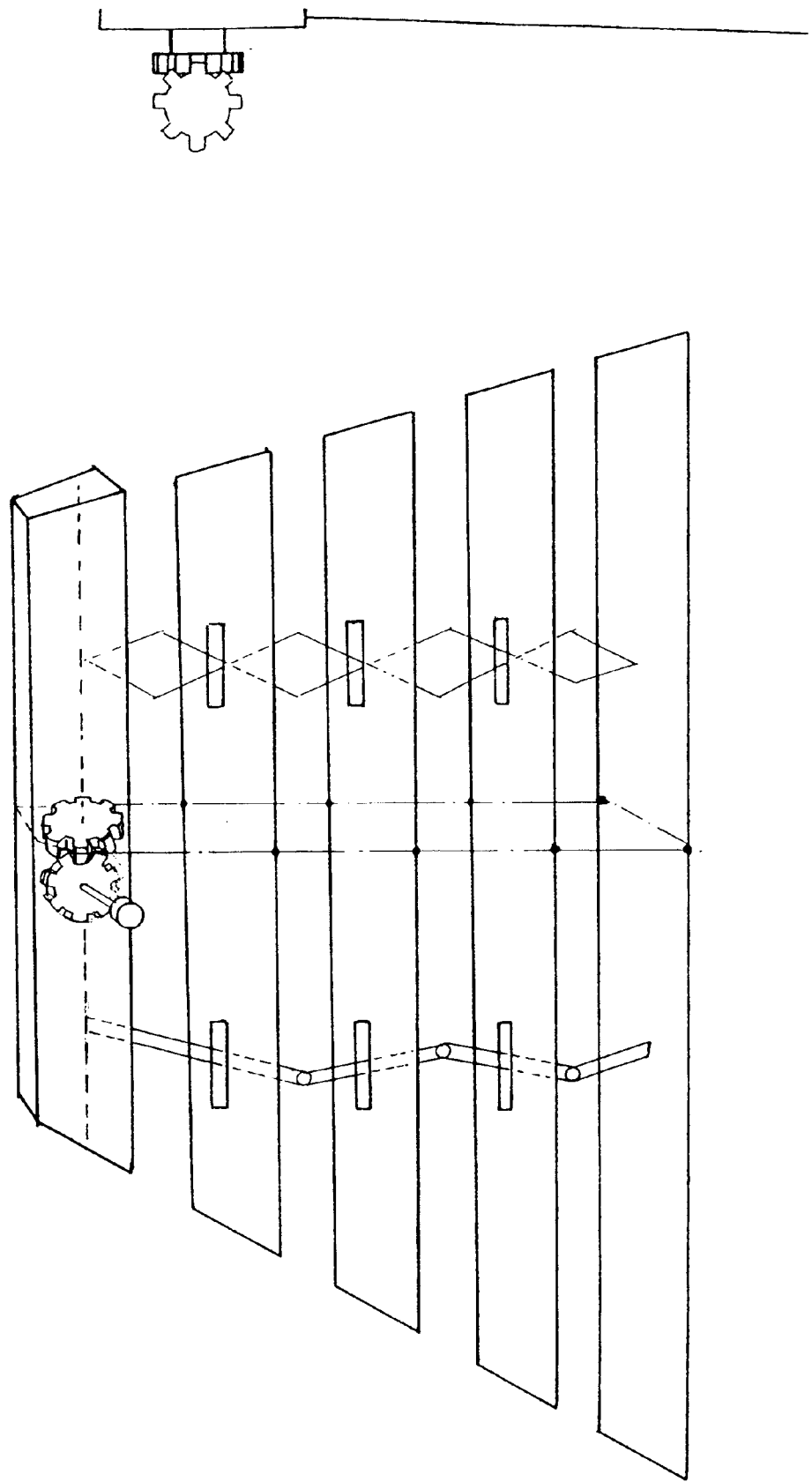
FIG. 13 is a schematic view of a first alternative embodiment of the extensible window shading device of the present invention.

FIGS. 13, 14, and 15 illustrated three alternative embodiments of the extensible window shading device of the present invention.

I claim:

1. An extensible window shading comprising:

at least an extensible device, at least a mounting device, a blinding device, and a rack fastening device;

each extensible device further comprises at least one head rack, a predetermined numbered of body racks, and at least one foot rack, so that each of said head racks is identical in shape and structure any other of said head racks, each of said body rack is identical in shape and structure to any other of said body racks, and each of said foot rack is identical in shape and structure to any other of said foot racks;

each of said head rack, each of said body rack and each of said foot rack having a first and second end;

each of said first and second end of said head rack, said body rack and said foot rack having an engaging hole, respectively, therein;

said head rack pivotally connecting to a top body rack of said body racks by a rack fastening device wherein said rack fastening device integrally attaches between said engaging hole of said first or second end of head rack and said engaging hole of said first or second head of said top body rack;

said engaging hole and said rack fastening device each having a set of engaging teeth on a surface thereon;

said body racks connecting end to end, wherein each of said body racks pivotally connects to an adjoining body rack of said body racks by said rack fastening device wherein said rack fastening device integrally attaches between said engaging hole of said first or second end of one of said body racks and said engaging hole of said first or second head of said adjoining body rack of said body racks;

a bottom body rack of said body racks pivotally connecting to a said foot rack by said rack fastening device wherein said rack fastening device integrally attaches between said engaging hole of said first or second end of said bottom body rack and said engaging hole of said first or second head of of said foot rack;

a top end of said top rack integrally connecting to a supporting head;

said supporting head mounting to a mounting device;

said mounting device affixing to an interior surface for affixing said extensible window shading device to said passenger transportation unit or said house above a window;

each of said body racks having at least one slat fastening hole defined within a center portion of said body rack;

said blinding device further comprising a predetermined number of thin and light slats;

at least one of each of said slats connecting to said fastening hole of each of said body rack by a cylindrical plug wherein said cylindrical plug may rotatably move within said fastening hole so as to allow said slat to rotate;

said extensible window shading device being folded up above said window when said extensible device is not being used in such a manner that said racks are folded and placedly resting side by side in a criss-cross pattern and said slats are sitting so that one of said slats placedly rests above another of said slats;

said extensible device being extended when said extensible winsow shading device is in use so as to cause each of said body racks, said head rack, and said foot rack to rotate away from said adjoining racks; and said slats being rotatable thereby allowing said slats to completely cover said windshield or said window for blocking out sunlight.

2. The extensible window shading device, as recited in claim 1, wherein said extensible window shading device having a pair of extensible devices, a pair of mounting devices;

said head rack further comprises a left head rack and a right head rack;

said body racks further comprise a predetermined number of left body racks and a predetermined number of right body racks corresponding in number to said left body racks;

said foot rack further comprises a left foot rack and a right foot rack;

said left head rack and said right head rack having the same length and geometric configuration as said left foot rack, and said right foot rack;

each of said slat having two cylindrical plugs coaxially protruding from a first and second end thereof, respectively;

said cylindrical plugs having a length at least as long as the width of two of said slat fastening hole;

each of said cylindrical plug providing a plurality of longitudinal tiny teeth thereon and an engaging slot and a corresponding cylindrical cap providing a plurality of longitudinal teeth thereon and an engaging slot for allowing easier engagement of said slat during installation;

each of said slats rotatably mounting to each of said body rack of said extensible device by inserting each of said cylindrical plugs through said slat fastening hole defined on said center portion of said left and right body racks, respectively, connecting with said corresponding cap;

said rack fastening device further comprises a fastening plug and a fastening cap, wherein said fastening plug further comprises a connecting portion having an engaging slot and a base head portion integrally attaching to said connecting portion, and said fastening cap further comprises a fastening portion having a through slot and a base cap portion integrally attaching to said fastening portion;

said fastening portion of said fastening cap providing a plurality of longitudinal tiny teeth along an outer surface for friction resistance;

said base head portion and said base cap portion each having a diameter that is greater than a diameter of said connecting portion and said fastening portion, respectively;

said diameter of said connecting portion of said fastening plug is fittedly equal to said diameter of said diameter of said fastening portion of said fastening cap;

said diameter of said fastening portion is fittedly equal to a diameter of said engaging hole of each of said head rack, said body rack, and said foot rack;

said connecting portion of said fastening plug has a length equal to a length of said fastening portion of said fastening cap;

whereby said extensible device is arranged in a crossing manner such that all of said left racks are positioned on top of said right racks, said second end of said left head rack is pivotally connecting with said first end of said right head rack by inserting said connecting portion of said fastening plug of said rack fastening device through said engaging hole and connecting with said fastening cap of said rack fastening device by attaching said fastening portion of said fastening cap with said connecting portion;

said first end of said left head rack is pivotally connecting with said first end of a first one of said right body racks by said rack fastening device in a same manner as the connecting of said left head rack and said right head rack;

said second end of said right head rack is pivotally connecting with said first end of a first one of said left body rack by said rack fastening device in said same manner as the connecting of said left head rack and said right head rack;

each of said left body rack and said right body rack criss-crossing, said second end of each of a total of one less than said predetermined number of said left body racks pivotally connecting to a first end of a right body rack by said rack fastening device in said same manner as the connecting of said left head rack and said right head rack;

said second end of each of a total of one less than said predetermined number of said right body racks pivotally connecting to a first end of a left body rack by said rack fastening device in said same manner as the connecting of said left head rack and said right head rack;

said center portion of said left body rack and of said right body rack aligning so qas to allow said cylindrical plugs of said slats to insert therein so as to fasten said slats on said left and right body rack of said extensible device;

said second end of a last left body rack of said left body racks pivotally connecting to a first end of said right foot rack by said rack fastening device in a same manner as the connecting of said left head rack and said right head rack;

said second end of a last right body rack of said right body racks pivotally connecting to first end of a second right foot rack by said rack fastening device in a same manner as the connecting of said left head rack and said right head rack;

said second end of said left foot rack pivotally connecting to said second end of said right foot rack by said rack fastening device in a same manner as the connecting of said left head rack and said right head rack;

said extensible window shading device having two support heads;

said mounting device further comprising a pair of mounting heads firmly affixing to an interior surface above a window for affixing two of said support heads for supporting two of said extensible devices in position respectively for mounting said slats between said extensible devices; and each of said mounting head having a vertical joint member downwardly extending from a horizontal mounting member adapting for adhering an edge of said mounting head to said interior surface adjacent to said respective window area.

3. The extensible window shading device, as recited in claim 1, wherein said extensible window shading device further comprising a slat adjusting means for rotating said slats together in one motion.

4. The extensible window shading device, as recited in claim 2, wherein said extensible window shading device further comprising a slat adjusting means for rotating said slats together in one motion.

* * * * *